United States Patent [19]

Ono et al.

[11] 4,256,559

[45] Mar. 17, 1981

[54] METHOD AND APPARATUS FOR REGENERATING SPENT PHOTOGRAPHIC BLEACH-FIXER SOLUTION

[75] Inventors: Takezo Ono, Takatsuki; Mineo Watanabe, Ibaraki; Seiki Iribe, Mihara, all of Japan

[73] Assignee: Teijin Engineering Ltd., Tokyo, Japan

[21] Appl. No.: 43,641

[22] Filed: May 30, 1979

[30] Foreign Application Priority Data

May 31, 1978 [JP] Japan .................................. 53/64377
Jul. 18, 1978 [JP] Japan .................................. 53/86789

[51] Int. Cl.³ ............................................. B01K 13/02
[52] U.S. Cl. .............................. 204/180 P; 204/109; 204/301
[58] Field of Search .................... 204/180 P, 301, 109

[56] References Cited

U.S. PATENT DOCUMENTS

| | | | |
|---|---|---|---|
| 3,925,175 | 12/1975 | Fisch et al. | 204/109 |
| 4,036,715 | 7/1977 | Baden et al. | 204/109 |
| 4,128,464 | 12/1978 | Idota | 204/180 P X |
| 4,145,271 | 3/1979 | Nosse et al. | 204/180 P |

FOREIGN PATENT DOCUMENTS

| | | |
|---|---|---|
| 48-18191 | 3/1973 | Japan . |
| 50-98837 | 8/1975 | Japan . |
| 51-18541 | 2/1976 | Japan . |
| 51-19535 | 2/1976 | Japan . |
| 51-23732 | 2/1976 | Japan . |
| 53-76027 | 7/1978 | Japan . |

*Primary Examiner*—Arthur C. Prescott
*Attorney, Agent, or Firm*—Wenderoth, Lind & Ponack

[57] ABSTRACT

An apparatus for regenerating a spent photograhic bleach-fixer solution, comprising (a) an electrodialysis cell including a cathode, an anode and alternating anion exchange membranes and cation exchange membranes arranged therebetween to define a cathode compartment, a plurality of alternating intermediate enionation and deionation compartments and an anode compartment, (b) an electrolysis cell connected to the enionation compartments of the electrodialysis cell so that an aqueous solution capable of dissolving silver salts can be circulated between the electrolysis cell and the enionation compartments, (c) a circulating tank for the spent bleach-fixer solution connected to the deionation compartments and the anode compartment of the electrodialysis cell for circulating the spent bleach-fixer solution between the circulating tank and both the deionation compartments and the anode compartment, and (d) a circulating tank for an electrolyte solution connected to the cathode compartment of the electrodialysis cell for circulating the electrolyte solution between the circulating tank and the cathode compartment; and a method for regenerating a spent photographic bleach-fixer solution using aforesaid apparatus.

6 Claims, 3 Drawing Figures

METHOD AND APPARATUS FOR REGENERATING SPENT PHOTOGRAPHIC BLEACH-FIXER SOLUTION

This invention relates to a method and an apparatus for regenerating a spent photographic bleach-fixer solution. More specifically, this invention relates to a method and an apparatus for regenerating the bleach-fixer solution spent in processing silver halide color photographic material, and also for recovering silver from the spent solution with good efficiency.

Silver halide color photographic material (color film or paper), after exposure, is processed by a series of steps including development, bleaching and fixing to form a color photographic image thereon. When the color photographic material is processed with a color developer solution, the exposed silver halide in the photographic emulsion is reduced to silver, and simultaneously the oxidized color developing agent (the oxidation product of an N,N-dialkyl-p-phenylenediamine derivative) reacts with a coupler in the emulsion to form a color image. Silver deposited in the photographic emulsion as a result of the color development is oxidized by treatment with the bleaching solution to change to silver halide, which is then converted to a silver complex salt by treatment with the fixer solution and dissolved away. Hence, only the color image remains on the photographic material.

In this manner, the removal of silver from the photographic emulsion requires treatment with the bleaching solution and the fixer solution. To simplify the processing steps, a monobatch called a "bleach-fixer solution" is also employed (see, for example, U.S. Pat. No. 3,582,322). The bleach-fixer solution contains a bleaching agent having weak oxidizability such as a ferric complex salt of an aminopolycarboxylic acid (e.g., a ferric complex salt of ethylenediaminetetraacetic acid) and an ordinary photographic fixer such as a compond capable of forming a silver complex salt (e.g., sodium thiosulfate or ammonium thiosulfate).

When a photographic material, after processing with a color developer solution, is treated with the bleach-fixer solution, the ferric complex salt of aminopolycarboxylic acid in the bleach-fixer solution oxidizes the developed silver in the photographic emulsion, and is itself reduced to the ferrous complex salt of aminopolycarboxylic acid. The silver ion resulting from the oxidation is converted to a silver complex salt by the action of the fixer, and is dissolved. The unexposed silver halide not reduced with the color developer solution reacts with the fixer in the bleach-fixer solution to be converted to a silver complex salt and a halogen ion (mainly a bromine ion), and is thus liberated from the photographic emulsion. Accordingly, the spent bleach-fixer contains the ferrous complex salt of aminopolycarboxylic acid, the silver complex salt and the halogen ion built up therein, and regeneration of the spent solution requires the following treatment procedures.

(a) To remove the silver complex salt from the spent solution, or to recover silver therefrom.

(b) To remove the halogen ion from the spent solution.

(c) To oxidize the ferrous complex salt of aminopolycarboxlic acid in the spent solution to a ferric complex salt of aminopolycarboxylic acid. (As is well known, the ferrous complex salt of aminopolycarboxylic acid readily changes to the corresponding ferric complex salt by air oxidization, electrolytic oxidation, etc.)

(d) To add a fresh supply of the consumed chemicals to adjust the composition of the regenerated bleach-fixer solution.

Techniques previously suggested for recovering silver from a spent bleach-fixer solution include, for example, a method of electrolyzing the spent bleach-fixer solution in an electrolytic cell including a cathode and an anode separated from each other by a diaphragm, while passing the spent solution from the cathode compartment to the anode compartment and excluding the air inside the electrolytic cell (Japanese Laid-Open Patent Publication No. 18191/73); and a method of electrolyzing a spent bleach-fixer solution while continuously passing the solution from the cathode section to the anode section in a diaphragm-free electrolytic cell (Japanese Laid-Open Patent Publication No. 98837/75).

According to these methods, the efficiency of recovery of silver is very low because reduction of the ferric complex salt of aminopolycarboxylic acid occurs prior to the electrolytic deposition of silver at the cathode, and the silver is liable to re-dissolve in the bleach-fixer solution. In the above-cited Japanese Laid-Open Patent Publication No. 18191/73, it is proposed to convert the ferric complex salt of aminopolycarboxylic acid to the corresponding ferrous complex salt in advance by adding a reducing agent such as sodium hydrosulfite to the spent bleach-fixer solution before the electrolysis, but the efficiency of silver recovery thus attained is still not enough.

It is an object of this invention to regenerate a spent photographic bleach-fixer solution for re-use in processing color photographic materials by removing silver complex salts and halogen ions therefrom without causing inconveniences.

Another object of this invention is to recover in the form of pure silver the silver complex salts removed from the spent blech-fixer solution with good efficiency and without any of the inconveniences described hereinabove.

Other objects of the invention will become apparent from the following description.

To achieve these objects, the present invention provides a method for recovering silver from a spent bleach-fixer solution while regenerating it, which comprises using an apparatus comprising (a) an electrodialysis cell including a cathode, an anode and alternating anion exchange membranes and cation exchange membranes arranged therebetween to define a cathode compartment, a plurality of intermediate enionation and deionation compartments, with a set of the deionation compartments being alternately disposed between a set of the enionation compartments, and an anode compartment, (b) an electrolysis cell connected to the enionation compartments of the electrodialysis cell so that an aqueous solution capable of dissolving silver salts can be circulated between the electrolysis cell and the enionation compartments, (c) a circulating tank for the spent bleach-fixer solution connected to the deionation compartments and the anode compartment of the electrodialysis cell for circulating the spent bleach-fixer solution between the circulating tank and both the deionation compartments and the anode compartment, and (d) a circulating tank for an electrolyte solution connected to the cathode compartment of the electrodialysis cell for circulating the electrolyte solution between the circulating tank and the cathode compartment; circulating the aqueous solution capable of dissolving silver salts between the enionation compartments and the electrolysis cell; circulating the spent bleach-fixer solution between the circulating tank for the spent bleach-fixer solution and both the deionation compartments and the anode compartment; circulating an electrolyte solution between the circulating tank for the electrolyte solution and the cathode compartment; passing a direct electric current across the anode and the cathode of the electrodialysis cell to perform electrodialysis continuously; and in the meanwhile, passing a direct electric current across the cathode and the anode of the electrolysis cell at a desired time to perform electrolysis.

The method and apparatus of this invention are described below more specifically with reference to the accompanying drawings in which.

Figure 1:
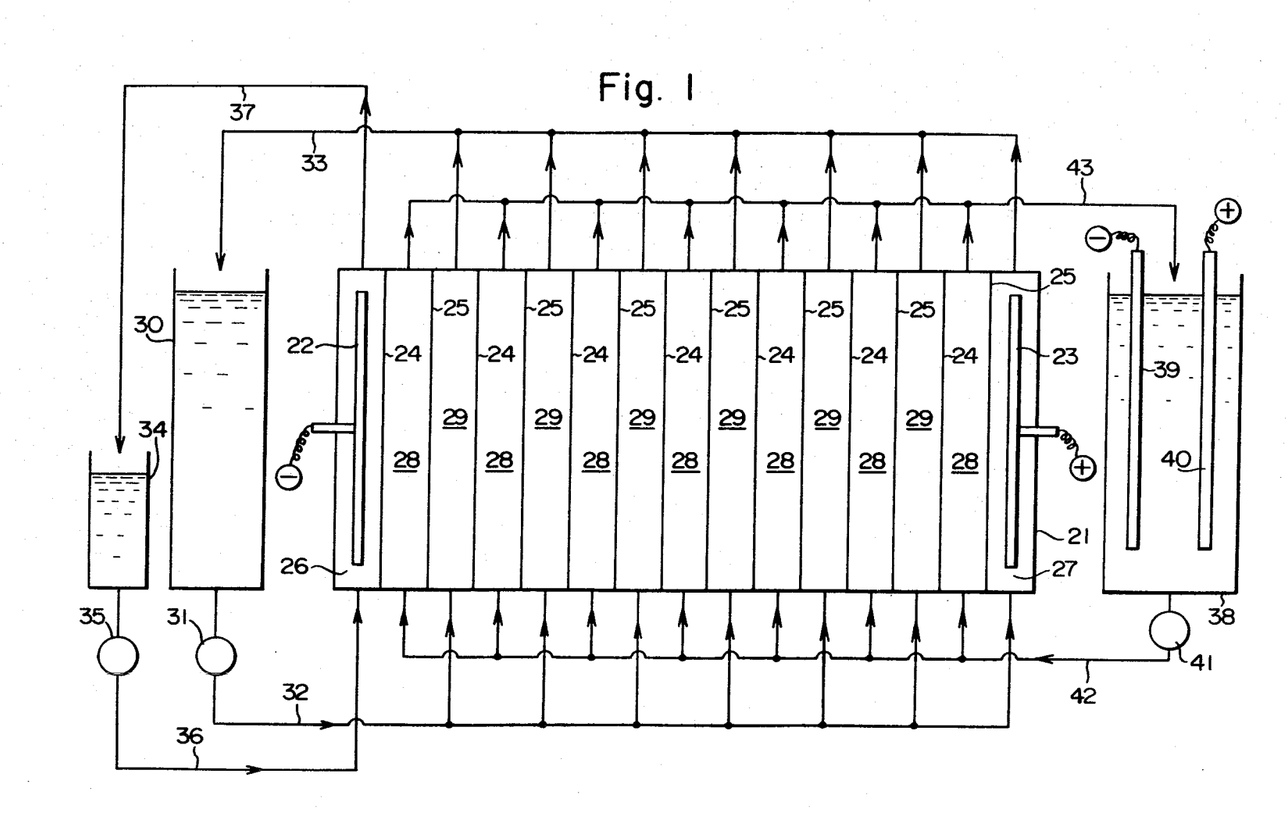
FIG. 1 is a diagram showing the simplest embodiment of an apparatus used in this invention to recover silver from a spent bleach-fixer solution while regenerating it.

Referring to FIG. 1, a cathode 22 and an anode 23 are provided at the terminals of an electrodialysis cell 21. Between these electrodes are alternately arranged a plurality of anion exchange membranes 24 and a plurality of cation exchange membranes 25 to define, from left to right in FIG. 1, a cathode compartment 26, an enionation compartment 28 (defined by an anion exchange membrane on the cathode side and a cation exchange membrane on the anode side), a deionation compartment 29 (defined by a cation exchange membrane on the cathode side and an anion exchange membrane on the anode side), an enionation compartment 28, a deionation compartment 29, ... a deionation compartment 29, an enionation compartment 28, and an anode compartment 27. The material for the cathode 22 is, for example, iron, nickel, stainless steel, or the like. The anode 23 is made of, for example, graphite, platinum, or platinum-plated titanium. The anion exchange membrane 24 is desirably a strong base-type anion exchange membrane, and the cation exchange membrane 25 is desirably a strong acid-type cation exchange membrane. The shell of the electrodialysis cell 21 is made of an insulating material such as polyvinyl chloride, rubber, or rubber-lined iron.

An electrolyte solution is filled in the cathode compartment 26 through a pipeline 36. An aqueous solution capable of dissolving silver salts is also filled in the enionation compartments 28 through a pipeline 42. On the other hand, a spent bleach-fixer solution is filled in the deionation compartments 29 and the anode compartment 27 through a pipeline 32.

The electrolyte solution may be an aqueous solution of sodium sulfate having a concentration of about 1 to 30 g/l which is the most conventional electrolyte. But it is desirably an aqueous solution capable of dissolving silver salts, such as an aqueous solution of sodium thiosulfate or ammonium thiosulfate in a concentration of about 1 to 30 g/l. Hence, an ordinary photographic fixer solution containing such a thiosulfate can be directly used as the electrolyte solution in this process.

A decomposition inhibitor such as sodium sulfite may be added to the silver salt-dissolving aqueous solution to be filled in the enionation compartments. Or a reducing agent such as sodium hydrosulfite may also be added to reduce a ferric complex salt of aminopolycarboxylic acid which, although in a very small amount, may move to the solution in the enionation compartments from the spent bleach-fixer solution in the deionation compartments.

The electrolysis cell 38 has a cathode 39 and an anode 40, and is connected to enionation compartments 28 by means of pipelines 42 and 43 through a pump 41 so as to circulate the silver salt-dissolving solution between the electrolysis cell 38 and the enionation compartments 28 of the electrodialysis cell 21. A tank 34 for circulating the electrolyte solution is connected to the cathode compartment 26 by means of pipelines 36 and 37 through a pump 35 so as to circulate the electrolyte solution between the tank 34 and the cathode compartmnet 26. A tank 30 for circulating the spent bleach-fixer solution is connected to the deionation compartments 29 and the anode compartment 27 by means of pipelines 32 and 33 through a pump 31 so as to circulate the spent bleach-fixer solution between the tank 30 and both the deionation compartments 29 and the anode compartment 27 of the electrodialysis cell 21.

The material for the cathode 39 and the anode 40 in the electrolysis cell 38 can be the same as those described hereinabove with regard to the cathode 22 and the anode 23 of the electrodialysis cell 21. The electrolysis cell 38, the tank 34, the tank 30 and the pipelines 32, 33, 36, 37, 42, and 43 are made of the same insulating material as the electrodialysis cell 21.

When a direct electric current is passed between the cathode 22 and the anode 23 of electrodialysis cell 21, and between the cathode 39 and the anode 40 of the electrolysis cell 38 in the apparatus shown in FIG. 1, while circulating the solutions as described above, a silver complex ion, a silver ion and a halogen ion contained in the spent bleach-fixer solution in the deionation compartments 29 migrate to the siler salt-dissolving solution in the enionation compartments 28 through the anion exchange membrane 24 or the cation exchange membrane 25 thereby to regenerate the spent bleach-fixer solution. In the meantime, the solution in the enionation compartments 28 in which the silver complex ion, silver ion and halogen ion build up is electrolyzed in the electrolysis cell 38, and metallic silver is electrodeposited at the cathode 39.

The ferric complex salt of aminopolycarboxylic acid and a ferrous complex salt of aminopolycarboxylic acid contained in the spent bleach-fixer solution in the deionation compartments 29 scarcely move to the silver salt-dissolving aqueous solution in the enionation compartments 28 by the electrodialysis treatment, and remain in the regenerated bleach-fixer solution. However, while the regenerated bleach-fixer solution is circulated between the tank 30 and the deionation compartments 29 and between the tank 30 and the anode compartment 27, the included ferrous complex salt of aminopolycarboxylic acid is oxidized in the anode compartment 27 to be converted to a ferric complex salt of aminopolycarboxylic acid.

One advantage of the present invention is that not only are the silver complex ion, silver ion and halogen ion contained in the spent bleach-fixer solution removed by the ion exchange membrane electrodialysis, but also the ferrous complex salt of aminopolycarboxylic acid contained in the spent solution is converted to a ferric complex salt of aminopolycarboxylic acid by anodic oxidation.

When the extent of the aforesaid anodic oxidation is insufficient, the spent bleach-fixer solution may be circulated into an anode compartment of a separate ion exchange membrane electrolytic cell composed of a cathode, an anode, and a diaphragm such as a cation exchange membrane to define a cathode compartment and an anode compartment so as to perform the anodic oxidation fully. In this case, the cathode compartment of the ion exchange membrane electrolytic cell is filled with an aqueous solution of an electrolyte such as sodium sulfate.

The electrodialytic treatment, i.e. the passing of a current across the cathode 22 and the anode 23, is continued until the silver concentration of the spent bleach-fixer solution in the deionation compartments 29 is reduced to the desired level, preferably nearly zero, at a current density of 0.01 to 2.0 $A/dm^2$, in the ion exchange membranes.

The electrolytic treatment, i.e. the passing of a current across the cathode 39 and the anode 40, need not always be performed simultaneously with the electrodialytic treatment, or need not be performed continuously. For example, the electrolysis treatment may be performed after the completion of the electrodialysis treatment. Or the electrolysis treatment may be performed intermittently so that the current is passed only when the solution in the enionation compartments 28 contains a silver complex ion and a silver ion in a certain predetermined concentration, e.g., in a concentration, as silver, of at least 2 g/l. It is generally preferred that the electrolysis should be performed at a current density of 0.05 to 1.0 $A/dm^2$ at the cathode while stirring the electrolyte solution as required. It is generally undesirable from the viewpoint of efficiency to continue the electrolysis after the amounts of the silver complex ion and silver ion in the solution are reduced to below 0.2 g/l as silver.

When the electrodialytic treatment is over, the bleach-fixer solution in the deionation compartments 29 is replenished with lacking chemicals for reuse in processing photographic material.

In the electrolytic treatment in the electrolysis cell 38, the electrolyte solution scarcely contains the ferric and ferrous complex salts of aminopolycarboxylic acid. Accordingly, the electrodeposited silver does not dissolve in the solution, and can be recovered with a very good efficiency.

Figure 2:
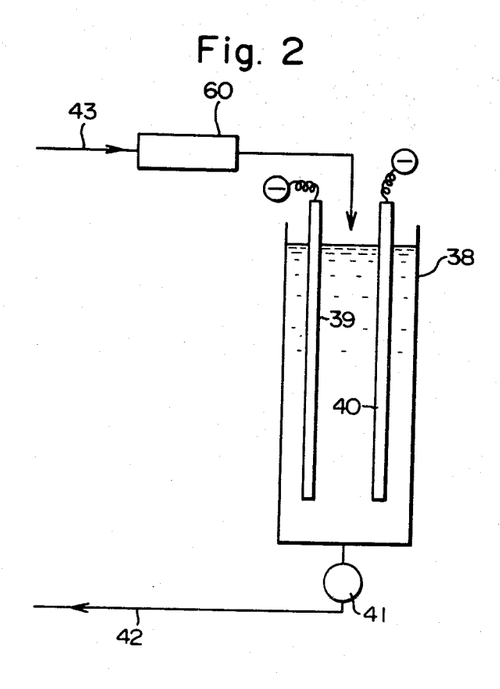
FIG. 2 is a diagram showing a partial modification of the apparatus shown in FIG. 1.

During the electrodialysis treatment described hereinabove, traces of the ferrous complex ion of aminopolycarboxylic acid and/or the ferric complex ion of aminopolycarboxylic acid tend to build up in the silver salt-dissolving aqueous solution present in the enionation compartments. According to one preferred embodiment of the present invention as shown in FIG. 2, means 60 for contacting the silver salt-dissolving aqueous solution with activated carbon is inserted in a path of the pipeline 43 leading from the enionation compartments of the electrodialytic cell in FIG. 1 to the electrolytic cell 38. The means can, for example, be of a structure similar to a horizontal or vertical filter packed with activated carbon. The silver complex ions, silver ion, sodium thiosulfate, ammonium thiosulfate, sodium sulfite, etc. are never adsorbed on the activated carbon.

When electrodialysis and electrolysis are performed in the same way as described above with regard to the apparatus shown in FIG. 1 by using the apparatus shown in FIG. 2, the silver salt-dissolving aqueous solution from the enionation compartments is electrolyzed after the traces of the contained ferric complex ion of aminopolycarboxylic acid and the ferrous complex ion of aminopolycarboxylic acid have been removed by adsorption on activated carbon 60. The amount of the ferric complex ion of aminopolycarboxylic acid reduced in the cathode 39 or the amount of electrodeposited silver dissolved again is only a trace, and the ratio of recovery of silver is very good. In addition, the silver recovered is of very high purity.

Known activated carbons in powder, granular or fibrous form obtained from charcoal, carbonized sawdust, coconut shell carbon or coal tar by a zinc chloride method or a steam method can be used in this invention. The suitable amount of the activated carbon is 10 to 500 g per 100 liters of the spent bleach-fixer solution to be used in the regenerating method of this invention.

As described above, the electrolysis treatment in the electrolytic cell 38 need not always be carried out continuously. Accordingly, in another preferred embodiment of this invention, as shown in FIG. 3, a tank 48 for circulating the silver salt-dissolving aqueous solution may be inserted in a circulating path between the enionation compartments 28 and the electrolytic cell 38 so as to make the two communicable with each other, and the silver salt-dissolving aqueous solution can be circulated without going through the electrolytic cell 38 by switching the path by means of a pump.

Figure 3:
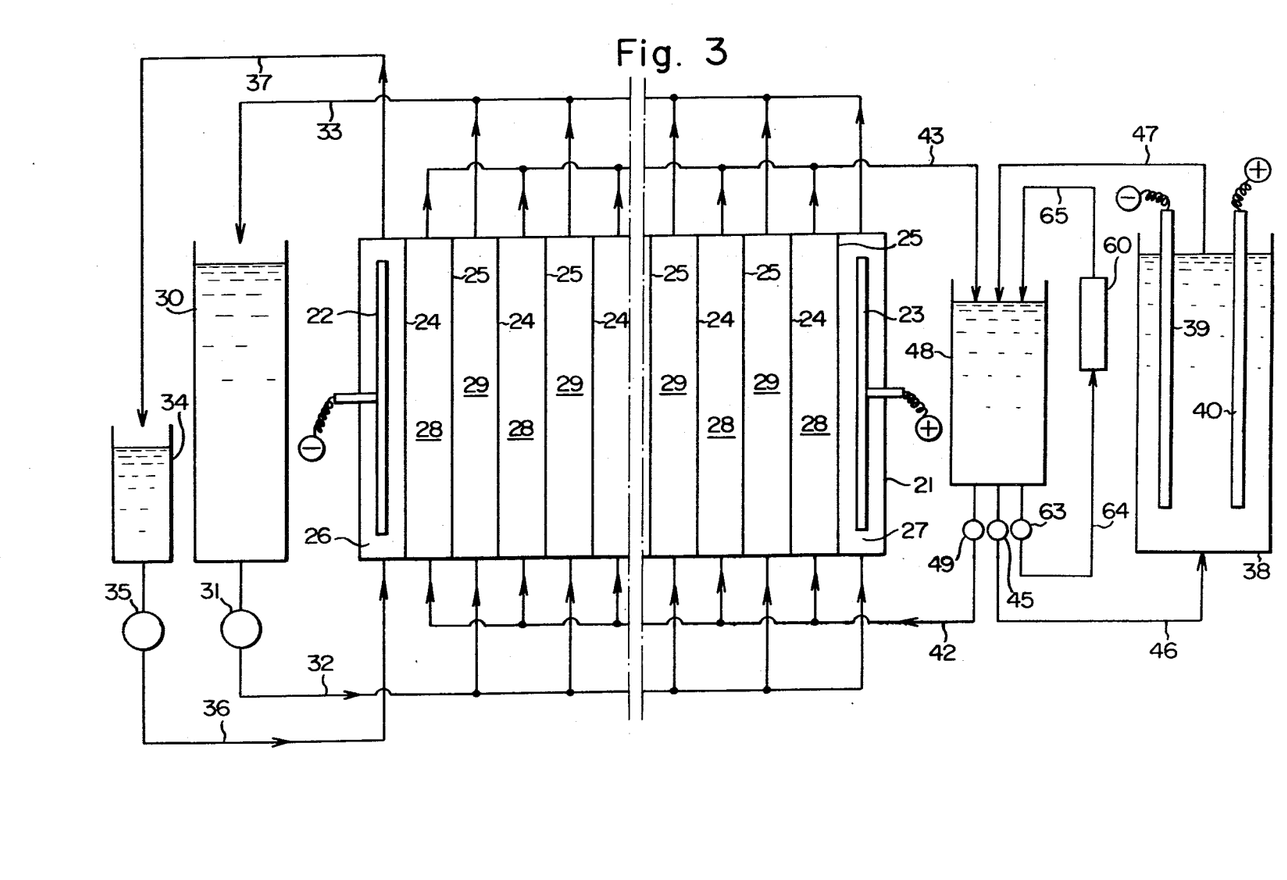
FIG. 3 is a diagram showing another embodiment of the apparatus of this invention.

According to the apparatus shown in FIG. 3, when pump 49 is operated, the silver salt-dissolving aqueous solution is circulated into the enionation compartments 28 through the pipeline 43, the circulating tank 48, the pump 49 and pipeline 42. When pump 45 is operated as required, a part of the silver-dissolving aqueous solution in the circulating tank 48 is introduced into the electrolytic cell 38 via the pump 45 and the pipeline 46, and is electrolyzed there. Thereafter, it is circulated into the circulating tank 48 via the pipeline 47.

With a view to removing the iron complex ions contained in the silver salt-dissolving aqueous solution in the same way as described hereinabove with regard to FIG. 2, the silver salt-dissolving aqueous solution can be circulated between a filtering means 60 packed with activated carbon and the circulating tank 48 through a pump 63, a pipeline 64, and a pipeline 65.

Thus, according to the embodiment shown in FIG. 3, it is possible to circulate the silver salt-dissolving aqueous solution without going through the electrolytic cell, and as required, to circulate the silver salt-dissolving aqueous solution while performing electrolysis and/or the removal of the iron complex ions.

The following non-limitative Examples illustrate the present invention.

EXAMPLE 1

A print-exposed color paper was processed in a color paper processor consisting of a developer tank, a bleach-fixer tank, a rinsing tank and a drying chamber. The color paper treated in the color developer tank was treated with a bleach-fixer solution having the composition shown in Table 1, column (A) in the bleach-fixer tank to dissolve silver and silver bromide remaining on the color paper. The spent bleach-fixer solution had the composition shown in Table 1, column (B).

The spent bleach-fixer solution was regenerated in the following manner using an apparatus of the type shown in FIG. 1. The electrodialytic cell 21 included a stainless steel cathode 22, a platinum-plated titanium anode 23, and fifty anion exchange membranes 24 and fifty cation exchange membranes 25 alternately arranged therebetween.

5000 liters of the spent bleach-fixer was circulated between tank 30 and both deionation compartments 29 and anode compartment 27. An aqueous solution of sodium sulfate (10 g/l) was circulated between cathode compartment 26 and electrolyte circulating tank 34. One hundred liters of an aqueous solution capable of dissolving a silver salt shown in Table 2, column (A) was circulated between enionation compartments 28 and electrolytic cell 38.

A direct electric current was passed between cathode 22 and anode 23 of electrodialytic cell 21 so that the current density in the ion exchange membranes was maintained at 1.0 A/dm$^2$.

When the electrodialysis was carried out for 3 hours, the composition of the silver salt-dissolving aqueous solution was as shown in Table 2, column (B). At this time, a direct electric current was passed between stainless steel cathode 39 and graphite anode 40 of electrolytic cell 38 so that the current density at the cathode was maintained at 0.15 A/dm$^2$. Thus, electrolysis for silver recovery was started.

When the electrodialysis was carried out for 22 hours (that is, when the electrolysis for silver recovery was performed for 19 hours), the composition of the spent bleach-fixer solution [Table 1, column (B)] changed as shown in Table 1, column (C). The composition of the silver salt-dissolving aqueous solution changed as shown in Table 2, column (C). The electrodialysis and electrolysis were stopped at this point.

Chemicals were added to the bleach-fixer solution after electrodialysis [Table 1, column (C)] to form a revived bleach-fixer solution [Table 1, column (D)]. The revived bleach-fixer solution was again used to bleach and fix a color paper. The photographic characteristics of the color paper obtained were quite the same as in the case of using a fresh bleach-fixer solution [Table 1, column (A)].

At the stainless steel cathode 39 of the electrolytic cell 38, 840 g of silver deposited. The current efficiency of silver deposition at the cathode was 80%.

TABLE 1

| | Bleach-fixer solution | | | |
|---|---|---|---|---|
| | (A) Fresh solution | (B) Spent solution (before electro-dialysis) | (C) After electro-dialysis for 22 hours | (D) Received solution |
| Ferric complex salt of ethylenediamine-tetraacetic acid (g/l) | 70 | 65 | 69 | 70 |
| Ferrous complex salt of ethylenediamine-tetraacetic acid (g/l) | 0 | 4 | 0 | 0 |
| Ammonium thiosulfate (g/l) | 160 | 140 | 125 | 160 |
| Sodium sulfite (g/l) | 15 | 11 | 7 | 15 |
| Complex silver ion (g/l as silver) | 0 | 2.5 | 0.3 | 0.3 |
| Bromine ion (g/l) | 0 | 1.8 | 0.1 | 0.1 |
| pH (at 25° C.) | 6.5 | 7.0 | 6.9 | 6.5 |
| Oxidation-reduction potential (versus saturated calomel electrode, mV) | −100 | −130 | −100 | −100 |

TABLE 2

| | Silver Salt-dissolving aqueous solution | | |
|---|---|---|---|
| | (A) Before electro-dialysis | (B) After 3-hour electro-dialysis | (C) After 22-hour electro-dialysis (after 19-hour electrolysis for silver recovery) |
| Ammonium thiosulfate (g/l) | 10 | 15 | 60 |
| Anhydrous sodium sulfate (g/l) | 5 | 6 | 10 |
| Dissolved silver component (g/l) | 0 | 1.5 | 0.5 |
| Dissolved iron component (g/l) | 0 | 0.020 | 0.110 |
| pH (at 25° C.) | 5.5 | 5.5 | 5.6 |
| Current efficiency (%) of silver deposition | — | — | 80 |

EXAMPLE 2

The same spent bleach-fixer solution [having the composition shown in Table 3, column (B)] as in Example 1 was regenerated in the following manner using an apparatus of the type shown in FIG. 2 (the same apparatus as shown in FIG. 1 except that a tubular filter 60 packed with activated carbon was inserted).

500 liters of the spent solution was circulated between tank 30 and both deionation compartments 29 and anode compartment 27. In the meantime, an aqueous solution of sodium sulfate in a concentration of 10 g/l was circulated between cathode compartment 26 and tank 34. Furthermore, 100 g of a silver salt-dissolving aqueous solution shown in Table 4, column (A) was circulated through enionation compartments 28, tubular filter 60 packed with activated carbon and electrolytic cell 38. The filter 60 disposed in circulating pipeline 43 was packed with 300 g of coconut shell activated carbon in granular form. A direct electric current was passed between the cathode and the anode of the electrodialytic cell so that the current censity at the ion exchange membranes was maintained at 1.0 A/dm$^2$.

When electrodialysis was performed for 3 hours, the composition of the silver salt-dissolving aqueous solution changed as shown in Table 4, column (B). At this time, a direct current was passed between stainless steel cathode 39 and graphite anode 40 of the electrolytic cell 38 so that the current density at the cathode was maintained at 0.15 A/dm$^2$. Thus, electrolysis for recovery of silver was started.

When the electrodialysis was performed for 22 hours (that is, when the electrolysis for silver recovery was performed for 19 hours), the composition of the spent bleach-fixer solution [Table 3, column (B)] changed as shown in Table 3, column (C), and the composition of the silver salt-dissolving aqueous solution changed as shown in Table 4, column (C). The electrodialysis and the electrolysis were stopped at this point.

Chemicals were added to the electrodialyzed spent bleach-fixer solution [having the composition shown in Table 3, column (C)] to form a revived bleach-fixer solution [having the composition shown in Table 3, column (D)]. The revived bleach-fixer solution was used again in processing a color paper. The resulting color paper had quite the same photographic characteristics as in the case of using a fresh bleach-fixer solution [Table 3, column (A)].

At the cathode 39 of the electrolytic cell 38, 1,000 g of silver was deposited. The current efficiency of silver deposition at the cathode was 95%.

TABLE 3

| | Bleach-fixer solution | | | |
|---|---|---|---|---|
| | (A) Fresh solution | (B) Spent solution (before electro- dialysis) | (C) After 22-hour electro- dialysis | (D) Revived solution |
| Ferric complex salt of ethylenediamine- tetraacetic acid (g/l) | 70 | 65 | 69 | 70 |
| Ferrous complex salt of ethylenediamine- tetraacetic acid (g/l) | 0 | 4 | 0 | 0 |
| Ammonium thiosulfate (g/l) | 160 | 140 | 125 | 160 |
| Sodium sulfate (g/l) | 15 | 11 | 7 | 15 |
| Complex silver ion (as silver, g/l) | 0 | 2.5 | 0.3 | 0.3 |
| Bromine ion (g/l) | 0 | 1.8 | 0.1 | 0.1 |
| pH (at 25° C.) | 6.5 | 7.0 | 6.9 | 6.5 |
| Oxidation-reduction potential (versus saturated calomel electrode, mV) | −100 | −130 | −100 | −100 |

TABLE 4

| | Silver salt-dissolving aqueous solution | | |
|---|---|---|---|
| | (A) Before electro- dialysis | (B) After 3- hour elec- trodialysis | (C) After 22- hour elec- trodialysis (after 19- hour elec- trolysis for silver recovery) |
| Ammonium thiosulfate (g/l) | 10 | 15 | 60 |
| Anhydrous sodium sulfite (g/l) | 5 | 6 | 10 |
| Dissolved silver component (g/l) | 0 | 1.5 | 0.5 |
| Dissolved iron component (g/l) | 0 | 0.015 | 0.015 |
| pH (at 25° C.) | 5.5 | 5.5 | 5.6 |
| Current efficiency of silver deposition (%) | — | — | 95 |

EXAMPLE 3

A print-exposed color paper was developed in a color paper processor consisting of a developer tank, a bleach-fixer tank, a rinsing tank and a drying chamber. The color paper processed in the developer tank was treated with a bleach-fixer solution having the composition shown in Table 5, column (A) in the bleach-fixer tank to dissolve silver and silver bromide remaining on the color paper. The spent bleach-fixer solution had the composition shown in Table 5, column (B).

The spent bleach-fixer solution was regenerated in the following manner in an apparatus of the type shown in FIG. 3 which did not contain tubular filter 60 packed with activated carbon. The electrodialysis cell 21 and the electrolytic cell 38 in FIG. 3 were the same as those shown in FIG. 1.

500 liters of the above spent solution was circulated between tank 30 and both deionation compartments 29 and anode compartment 27. An aqueous solution of sodium sulfate (10 g/l) was circulated between cathode compartment 26 and an electrolyte circulating tank 34. Furthermore, 100 liters of a silver salt-dissolving aqueous solution having the composition shown in Table 6, column (A) was circulated between enionation compartments 28 and circulating tank 48. A direct current was passed between the cathode 22 and the anode 23 of the electrodialytic cell 21 so that the current density at the ion exchange membranes was maintained at 1.0 A/dm².

When the electrodialysis was performed for 22 hours, the composition of the spent bleach-fixer solution [Table 5, column (B)] changed as shown in Table 5, column (C). Chemicals were added to the electrodialyzed spent solution [Table 5, column (C)] to form a revived bleach-fixer solution [Table 5, column (D)]. The revived bleach-fixer solution was again used to process a color paper. The resulting color paper had quite the same photographic characteristics as in the case of using a fresh bleach-fixer solution [Table 5, column (A)].

After the electrodialysis, the composition of the silver salt-dissolving aqueous solution [Table 6, column (A)] in the circulating tank 48 changed as shown in Table 6, column (B). A half (50 liters) of the silver salt-dissolving aqueous solution [Table 6, column (B)] was transferred to a separate vessel, and the remaining half (50 liters) of the aqueous solution was circulated between the circulating tank 48 and the electrolytic cell 38. A direct current was passed between cathode 39 and anode 40 so that the current density at the cathode was maintained at 0.15 A/dm². The electrolysis was continued until the concentration of the soluble silver component in the silver salt-dissolving aqueous solution reached 0.5 g/liter. After the electrolysis, the composition of the silver salt-dissolving aqueous solution was as shown in Table 6, column (C), and about 525 g of silver deposited on the stainless steel cathode. The current efficiency of silver deposition at the cathode was 85%.

TABLE 5

| | Bleach-fixer solution | | | |
|---|---|---|---|---|
| | (A) Fresh solution | (B) Spent solution (before electro- dialysis) | (C) After 22-hour electro- dialysis | (D) Revived solution |
| Ferric complex salt of ethylenediamine- tetraacetic acid (g/l) | 70 | 64 | 68 | 70 |
| Ferrous complex salt of ethylenediamine- tetraacetic acid (g/l) | 0 | 4 | 0 | 0 |
| Ammonium thiosulfate (g/l) | 160 | 140 | 125 | 160 |
| Sodium sulfite (g/l) | 15 | 11 | 7 | 15 |
| Complex silver ion (as silver, g/l) | 0 | 2.5 | 0.3 | 0.3 |
| Bromine ion (g/l) | 0 | 1.8 | 0.1 | 0.1 |
| pH (at 25° C.) | 6.5 | 7.0 | 6.9 | 6.5 |
| Oxidation-reduction potential (versus saturated calomel electrode, mV) | −100 | −130 | −100 | −100 |

TABLE 6

| | Silver salt-dissolving aqueous solution | | |
|---|---|---|---|
| | (A) Before electro- dialysis | (B) After 22-hour electro- dialysis | (C) After elec- trolysis of the solution (B) |
| Ammonium thiosulfate (g/l) | 10 | 60 | 58 |
| Anhydrous sodium sulfate (g/l) | 5 | 10 | 8 |
| Dissolved silver component (g/l) | 0 | 11 | 0.5 |
| Dissolved iron component (g/l) | 0 | 0.110 | 0.110 |
| pH (at 25° C.) | 5.5 | 5.5 | 5.6 |
| Current efficiency of silver deposition (%) | — | — | 85 |

EXAMPLE 4

Fifty liters of the silver salt-dissolving aqueous solution [Table 7, column (B)] transferred into the separate vessel in Example 3 was placed in a circulating tank 48, and circulated for 5 hours between the tank 48 and a tubular filter 60 packed with 300 g of granular activated carbon from coconut shell. After the five-hour period, the composition of the silver salt-dissolving aqueous solution changed as shown in Table 7, column (C). The silver salt-dissolving aqueous solution [Table 7, column (C)] was circulated between the tank 48 and the electrolytic cell 38, and electrolyzed by passing a current between cathode 39 and anode 40 so that the current density at the cathode was maintained at 0.15 A/dm$^2$. The electrolysis was continued until the concentration of the dissolved silver component in the silver salt-dissolving aqueous solution reached 0.5 g/liter. After the electrolysis, the composition of the silver salt-dissolving aqueous solution was as shown in Table 7, column (D). About 525 g of silver deposited on the stainless steel cathode. The current efficiency of silver deposition at the cathode was 98%.

TABLE 7

| | Silver salt-dissolving aqueous solution | | | |
|---|---|---|---|---|
| | (A) Before electro- dialysis | (B) After 22-hour electro- dialysis | (C) After treatment of the solution (B) with activated carbon | (D) After electro- lysis of the solu- tion (C) |
| Ammonium thiosulfate (g/l) | 10 | 60 | 60 | 58 |
| Anhydrous sodium sulfite (g/l) | 5 | 10 | 9 | 8 |
| Dissolved silver component (g/l) | 0 | 11 | 11 | 0.5 |
| Dissolved iron component (g/l) | 0 | 0.110 | 0.015 | 0.015 |
| pH (at 25° C.) | 5.5 | 5.5 | 5.5 | 5.6 |
| Current efficiency of silver deposition (%) | — | — | — | 98 |

What we claim is:

1. A method for regenerating a spent photographic bleach-fixer solution containing silver complex ions, silver ions, halogen ions and ferrous complex salt, which comprises subjecting said bleach-fixer solution to electrodialysis across ion exchange membranes to transfer said silver complex ions, silver ions and halogen ions from said bleach-fixer solution, through said ion exchange membranes, to an aqueous solution capable of dissolving silver salts, said ferrous complex salt being substantially completely retained in said bleach-fixer solution, subjecting the resultant aqueous solution containing silver complex ions, silver ions and halogen ions to electrolysis to electrodeposit metallic silver, and subjecting the resultant bleach-fixer solution to anodic oxidation to convert said retained ferrous complex salt to ferric complex salt.

2. A method for regenerating a spent photographic bleach-fixer solution, which comprises;

providing an apparatus comprising (a) an electrodialysis cell including a cathode, an anode and alternating anion exchange membranes and cation exchange membranes arranged between said cathode and said anode to define a cathode compartment, a plurality of alternating intermediate enionation and deionation compartments, and an anode compartment, (b) an electrolysis cell having a cathode and an anode, said electrolysis cell being connected to said enionation compartments of said electrodialysis cell so that an aqueous solution capable of dissolving silver salts can be circulated between said electrolysis cell and said enionation compartments, (c) a first circulating tank, for said spent bleach-fixer solution, connected to said deionation compartments and said anode compartment of said electrodialysis cell for circulating said spent bleach-fixer solution between said first calculating tank and said deionation compartments and also between said first circulating tank and said anode compartment, and (d) a second circulating tank, for an electrolyte solution, connected to said cathode compartment of said electrodialysis cell for circulating said electrolyte solution between said second circulating tank and said cathode compartment, circulating said aqueous solution capable of dissolving silver salts between said enionation compartments and said electrolysis cell, circulating said spent bleach-fixer solution between said first circulating tank and said deionation compartments, and also between said first circulating tank and said anode compartment, circulating said electrolyte solution between said second circulating tank and said cathode compartment, passing a direct electric current between said cathode and said anode of said electrodialysis cell to continuously perform electrodialysis, and at a desired time, passing a direct electric current between said cathode and said anode of said electrolysis cell to perform electrolysis.

3. A method according to claim 2, wherein means are provided for contacting said aqueous solution capable of dissolving silver salts with activated carbon, said means being disposed in a path leading from said enionation compartments to said electrolysis cell.

4. A method according to claim 2, wherein said electrolysis cell is connected to said enionation compartments through a third tank, for circulating said aqueous solution capable of dissolving silver salts, said third tank serving to make said electrolysis cell and said enionation compartments communicate with each other.

5. A method according to claim 4, wherein said aqueous solution capable of dissolving silver salts is circulated between said third circulating tank and said enionation compartments; said spent bleach-fixer solution is circulated between said first circulating tank and said deionation compartments, and also between said first circulating tank and said anode compartment; said electrolyte solution is circulated between said second circulationg tank and said cathode compartment; a direct electric current is passed between said cathode and said andoe of said electrodialysis cell to continuously perform electrodialysis; and, at a desired time, while said aqueous solution capable of dissolving silver salts is being circulated between said third circulating tank and said electrolysis cell, a direct electric current is passed between said cathode and said anode of said electrolysis cell to perform electrolysis.

6. A method according to claim 4, wherein means are provided for contacting said aqeuous solution capable of dissolving silver salts with activated carbon, said means being disposed in a manner such that said aqueous solution can be circulated between said means and said third circulating tank; said aqueous solution capable of dissolving silver salts is circulated between said third circulating tank and said enionation compartments; said spent bleach-fixer solution is circulated between said first circulating tank and said deionation compartments, and also between said first circulating tank and said anode compartment; said electrolyte solution is circulated between said second circulating tank and said cathode compartment; a direct electric current is passed between said cathode and said anode of said electrodialysis cell to continuously perform electrodialysis; at a desired time, said aqueous solution capable of dissolving silver salts is contacted with said activated carbon; and, at a desired time, while said aqueous solution capable of dissolving silver salts is being circulated between said third circulating tank and said electrolysis cell, a direct electric current is passed between said cathode and said anode of said electrolysis cell to perform electrolysis.

* * * * *